United States Patent
Aida et al.

(10) Patent No.: US 7,662,890 B2
(45) Date of Patent: Feb. 16, 2010

(54) COMPOSITION FOR DIP FORMING AND MOLDING OBTAINED BY DIP FORMING

(75) Inventors: Misao Aida, Kanagawa (JP); Osamu Ishizu, Kanagawa (JP); Hisanori Ota, Kanagawa (JP)

(73) Assignee: Zeon Corporation, Tokyo (JP)

( * ) Notice: Subject to any disclaimer, the term of this patent is extended or adjusted under 35 U.S.C. 154(b) by 711 days.

(21) Appl. No.: 10/589,366

(22) PCT Filed: Mar. 29, 2005

(86) PCT No.: PCT/JP2005/005831

§ 371 (c)(1),
(2), (4) Date: Aug. 14, 2006

(87) PCT Pub. No.: WO2005/095508

PCT Pub. Date: Oct. 13, 2005

(65) Prior Publication Data

US 2007/0149693 A1   Jun. 28, 2007

(30) Foreign Application Priority Data

Mar. 31, 2004  (JP) .............................. 2004-103424

(51) Int. Cl.
*C08F 8/00* (2006.01)
*C08F 236/14* (2006.01)
*A41D 19/00* (2006.01)

(52) U.S. Cl. .................... 525/332.5; 525/373; 524/822; 2/168

(58) Field of Classification Search .............. 525/332.5, 525/373; 524/822; 2/168
See application file for complete search history.

(56) References Cited

U.S. PATENT DOCUMENTS 3,422,050 A * 1/1969 Brown et al. ................. 442/149
5,910,533 A * 6/1999 Ghosal et al. ................ 524/560
6,627,325 B1   9/2003 Ghosal et al.
2004/0242766 A1  12/2004 Gaschler et al.

FOREIGN PATENT DOCUMENTS

| CN | 1260814 A | 7/2000 |
|---|---|---|
| EP | 1361247 A1 | 11/2003 |
| GB | 1220384 | 1/1971 |
| JP | 2001-040142 A | 2/2001 |
| JP | 2001-131812 A | 5/2001 |
| JP | 2001-192918 A | 7/2001 |
| JP | 2003-342303 A | 12/2003 |
| WO | WO-98/54250 A1 | 12/1998 |
| WO | WO-98/054250 A1 | 12/1998 |
| WO | WO-03/029316 A1 | 4/2003 |
| WO | WO-03/080722 A1 | 10/2003 |

OTHER PUBLICATIONS

Database WPI, Section Ch., Week 200421, Thomas Scientific, London, GB; an 2004-217524, (Oct. 10, 2003) XP002520539.

* cited by examiner

*Primary Examiner*—Fred M Teskin
(74) *Attorney, Agent, or Firm*—Birch, Stewart, Kolasch & Birch, LLP

(57) ABSTRACT

A dip-forming composition of the present invention comprises a dip-forming latex containing a copolymer obtained by copolymerizing 100 parts by weight of a monomer mixture containing 70 to 85 parts by weight of a conjugated diene monomer, 10 to 28 parts by weight of an aromatic vinyl monomer, 2 to 5 parts by weight of an ethylenically unsaturated acid monomer and 0 to 18 parts by weight of other monomer copolymerizable with these monomers, said copolymer having a toluene insoluble content of 30% by weight or more and a toluene swelling degree of 70 times or less; and a vulcanizing agent, a vulcanization accelerator and zinc oxide which are blended in said latex in amounts of 0.5 to 2 parts by weight, 0.25 to 1 part by weight and 0.5 to 1 part by weight, respectively, on the basis of 100 parts by weight of a solid content of the latex. There can be provided a dip-formed article exhibiting an excellent touch and feel, sufficient tensile strength and elongation at break and an excellent persistence of close fitting, as well as a dip-forming composition capable of providing such a dip-formed article.

7 Claims, No Drawings

COMPOSITION FOR DIP FORMING AND MOLDING OBTAINED BY DIP FORMING

TECHNICAL FIELD

The present invention relates to dip-forming compositions and dip-formed articles, and more particularly to dip-formed articles having an excellent touch and feel, sufficient tensile strength and elongation at break, and an excellent persistence of close fitting, and dip-forming compositions capable of providing the dip-formed articles.

BACKGROUND ART

Rubber gloves have been extensively used in household applications, various industrial applications such as food industries and electronic parts production industries, and medical applications. It has been conventionally required that these rubber gloves have a good stretchability even upon application of a smaller force thereto and a good followability to finger motion so as to prevent users' hands from being tired even when wearing for a long period of time (a good touch and feel), are free from breaking during wearing (sufficiently high tensile strength and elongation at break), and exhibit a capability of retaining a tight-fitting condition (a good persistence of close fitting).

Hitherto, there have been frequently used rubber gloves obtained by dip-forming natural rubber latexes. However, the rubber gloves made of natural rubber latexes have such a fear that some users tend to undergo allergy to proteins contained in a rubber component thereof even in a trace amount. Therefore, there have been conventionally proposed gloves made of synthetic rubber latexes which are free from the above drawback.

For example, in U.S. Pat. No. 5,910,533, there have been proposed gloves obtained by dip-forming a dip-forming composition containing a carboxyl-modified conjugated diene-based rubber latex which is produced by subjecting a monomer mixture containing a conjugated diene monomer in an amount of 80 to 99% by weight to emulsion copolymerization and has a glass transition temperature of −50° C. or lower. However, the gloves proposed in U.S. Pat. No. 5,910,533 tend to be insufficient in tensile strength notwithstanding an excellent touch and feel and a sufficient elongation at break thereof.

In U.S. Pat. No. 6,627,325, there have been proposed gloves obtained by dip-forming a dip-forming composition containing a copolymer latex which is produced by subjecting a monomer mixture containing 5 to 65% by weight of an aromatic vinyl monomer, 35 to 90% by weight of a conjugated diene monomer and 0.5 to 10% by weight of an unsaturated acid monomer to emulsion copolymerization and has a toluene insoluble content of 85% by weight or less. More specifically, U.S. Pat. No. 6,627,325 discloses gloves formed from the copolymer latex obtained by emulsion-copolymerizing the monomer mixture containing 34% by weight of styrene. However, the gloves proposed in U.S. Pat. No. 6,627,325 tend to be ill-balanced between touch and feel and tensile strength and insufficient in persistence of close fitting notwithstanding a sufficient elongation at break thereof.

Further, Japanese Patent Application Laid-open No. 131812/2001 discloses gloves obtained by dip-forming a styrene-butadiene rubber latex having a glass transition temperature of 20° C. or lower which satisfy such a condition that a ratio of a tensile stress thereof as measured after 6 min from 100% elongation thereof, to an initial tensile stress thereof as measured immediately after reaching the 100% elongation (stress retention rate) is in the range of 30 to 50%. More specifically, in Japanese Patent Application Laid-open No. 131812/2001, there are disclosed gloves produced from the styrene-butadiene rubber latex having a relatively high styrene content. However, the gloves disclosed in Japanese Patent Application Laid-open No. 131812/2001 tend to be insufficient in touch and feel and persistence of close fitting.

DISCLOSURE OF THE INVENTION

In view of the above conventional problems, an object of the present invention is to provide a dip-formed article having an excellent touch and feel, sufficient tensile strength and elongation at break, and an excellent persistence of close fitting, as well as a dip-forming composition capable of providing the dip-formed article.

As a result of intensive and extensive researches to solve the above problems, the inventors have found that the above object can be achieved by using a dip-forming composition which is obtained by blending a dip-forming latex composed of a copolymer produced by copolymerizing a monomer mixture containing a conjugated diene monomer, an aromatic vinyl monomer, an ethylenically unsaturated acid monomer and the other monomer copolymerizable with these monomers at a specific mixing ratio which copolymer has a specific toluene insoluble content and a specific toluene swelling degree, with specific amounts of a vulcanizing agent, a vulcanization accelerator and zinc oxide. The present invention has been accomplished on the basis of the above finding.

Thus, in an aspect of the present invention, there is provided a dip-forming latex containing a copolymer obtained by copolymerizing 100 parts by weight of a monomer mixture containing 70 to 85 parts by weight of a conjugated diene monomer, 10 to 28 parts by weight of an aromatic vinyl monomer, 2 to 5 parts by weight of an ethylenically unsaturated acid monomer and 0 to 18 parts by weight of other monomer copolymerizable with these monomers, said copolymer having a toluene insoluble content of 30% by weight or more and a toluene swelling degree of 70 times or less; and a vulcanizing agent, a vulcanization accelerator and zinc oxide which are blended in said latex in amounts of 0.5 to 2 parts by weight, 0.25 to 1 part by weight and 0.5 to 1 part by weight, respectively, on the basis of 100 parts by weight of a solid content of the latex.

In another aspect of the present invention, there is provided a dip-formed article obtained by dip-forming the above dip-forming composition.

In accordance with the present invention, there are provided a dip-formed article having an excellent touch and feel, sufficient tensile strength and elongation at break, and an excellent persistence of close fitting, and a dip-forming composition capable of providing such a dip-formed article.

PREFERRED EMBODIMENTS FOR CARRYING OUT THE INVENTION

The present invention is described in detail below.

Dip-Forming Latex

The di-forming latex used in the present invention contains a copolymer obtained by copolymerizing 100 parts by weight of a monomer mixture composed of 70 to 85 parts by weight of a conjugated diene monomer, 10 to 28 parts by weight of an aromatic vinyl monomer, 2 to 5 parts by weight of an ethylenically unsaturated acid monomer and 0 to 18 parts by weight of the other ethylenically unsaturated monomer copolymerizable with these monomers.

Examples of the conjugated diene monomer include 1,3-butadiene, isoprene, 2,3-dimethyl-1,3-butadiene, 2-ethyl-1,3-butadiene, 1,3-pentadiene and chloroprene. Among these conjugated diene monomers, preferred are 1,3-butadiene and isoprene, and more preferred is 1,3-butadiene. These conjugated diene monomers may be used alone or in combination of any two or more thereof.

The amount of the conjugated diene monomer used is 70 to 85 parts by weight, preferably 72 to 82 parts by weight and more preferably 73 to 80 parts by weight on the basis of 100 parts by weight of the whole monomers. When the amount of the conjugated diene monomer used is too small, the resultant dip-formed article tends to be deteriorated in touch and feel. On the other hand, when the amount of the conjugated diene monomer used is too large, the resultant dip-formed article tends to be deteriorated in tensile strength.

Examples of the aromatic vinyl monomer include styrene, α-methylstyrene, p-methylstyrene, p-phenylstyrene, p-methoxystyrene, chloromethylstyrene, m-fluorostyrene and vinyl naphthalene. Among these aromatic vinyl monomers, most preferred is styrene. These aromatic vinyl monomers may be used alone or in combination of any two or more thereof.

The amount of the aromatic vinyl monomer used is 10 to 28 parts by weight, preferably 12 to 25 parts by weight and more preferably 15 to 24 parts by weight on the basis of 100 parts by weight of the whole monomers. When the amount of the aromatic vinyl monomer used is too small, the resultant dip-formed article tends to be deteriorated in tensile strength. On the other hand, when the amount of the aromatic vinyl monomer used is too large, the resultant dip-formed article tends to be deteriorated in touch and feel.

The ethylenically unsaturated acid monomer is not particularly limited as long as it is an ethylenically unsaturated monomer containing an acid group such as a carboxyl group, a sulfonic group and an acid anhydride group. Examples of the ethylenically unsaturated acid monomer include ethylenically unsaturated monocarboxylic acid monomers such as acrylic acid and methacrylic acid; ethylenically unsaturated polycarboxylic acid monomers such as itaconic acid, maleic acid and fumaric acid; ethylenically unsaturated polycarboxylic acid anhydrides such as maleic anhydride and citraconic anhydride; ethylenically unsaturated polycarboxylic acid partial ester monomers such as monobutyl fumarate, monobutyl maleate and mono-2-hydroxypropyl maleate; and ethylenically unsaturated sulfonic acid monomers such as styrenesulfonic acid. Among these ethylenically unsaturated acid monomers, preferred are ethylenically unsaturated carboxylic acids, more preferred are ethylenically unsaturated monocarboxylic acids, and most preferred is methacrylic acid. These ethylenically unsaturated acid monomers may also be used in the form of an alkali metal salt or an ammonium salt. These ethylenically unsaturated acid monomers may be used alone or in combination of any two or more thereof.

The amount of the ethylenically unsaturated acid monomer used is 2 to 5 parts by weight, preferably 2.5 to 4.5 parts by weight and more preferably 3 to 4 parts by weight on the basis of 100 parts by weight of the whole monomers. When the amount of the ethylenically unsaturated acid monomer used is too small, the resultant dip-formed article tends to be deteriorated in tensile strength. On the other hand, when the amount of the ethylenically unsaturated acid monomer used is too large, the resultant dip-formed article tends to be deteriorated in touch and feel as well as persistence of close fitting.

In the present invention, in addition to the above monomers, there may also be used the other monomer copolymerizable with these monomers.

Examples of the other monomer include fluoroalkyl vinyl ethers such as fluoroethyl vinyl ether; ethylenically unsaturated amide monomers such as (meth)acrylamide, N-methylol (meth)acrylamide, N,N-dimethylol (meth)acrylamide, N-methoxymethyl(meth)acrylamide and N-propoxymethyl (meth)acrylamide; ethylenically unsaturated carboxylic acid ester monomers such as methyl(meth)acrylate, ethyl(meth) acrylate, butyl(meth)acrylate, 2-ethylhexyl(meth)acrylate, trifluoroethyl(meth)acrylate, tetrafluoropropyl (meth)acrylate, dibutyl maleate, dibutyl fumarate, diethyl maleate, methoxymethyl(meth)acrylate, ethoxyethyl(meth)acrylate, methoxyethoxyethyl(meth)acrylate, cyanomethyl(meth)acrylate, 2-cyanoethyl (meth)acrylate, 1-cyanopropyl(meth)acrylate, 2-ethyl-6-cyanohexyl (meth)acrylate, 3-cyanopropyl(meth) acrylate, hydroxyethyl(meth)acrylate, hydroxypropyl(meth) acrylate, glycidyl(meth)acrylate and dimethylaminoethyl (meth)acrylate; ethylenically unsaturated nitrile monomers such as (meth)acrylonitrile; and crosslinkable monomers such as divinyl benzene, polyethylene glycol (meth)acrylate, polypropylene glycol (meth)acrylate, trimethylolpropane tri (meth)acrylate and pentaerythritol (meth)acrylate. These other monomers may be used alone or in combination of any two or more thereof.

The amount of the other monomer used is 18 parts by weight or less, preferably 10 parts by weight or less and more preferably 5 parts by weight or less on the basis of 100 parts by weight of the whole monomers. When the amount of the other monomer used is too large, it is not possible to obtain a dip-forming latex capable of providing such a dip-formed article exhibiting various excellent properties as aimed by the present invention.

The di-forming latex may be usually produced by subjecting the above monomer mixture to emulsion copolymerization. The emulsion copolymerization may be conducted by conventionally known methods, for example, by copolymerizing the above monomer mixture in water in the presence of an emulsifying agent as well as a polymerization initiator.

Examples of the emulsifying agent include nonionic emulsifying agents such as polyoxyethylene alkyl ethers, polyoxyethylene alkyl phenol ethers, polyoxyethylene alkyl esters and polyoxyethylene sorbitan alkyl esters; anionic emulsifying agents, e.g., salts of fatty acids such as myristic acid, palmitic acid, oleic acid and linolenic acid, alkylbenzenesulfonic acid salts such as sodium dodecylbenzenesulfonate, higher alcohol sulfuric acid esters, and alkylsulfosuccinic acid salts; and copolymerizable emulsifying agents such as sulfo-esters of α,β-unsaturated carboxylic acids, sulfates of α,β-unsaturated carboxylic acids, and sulfoalkyl aryl ethers. Among these emulsifying agents, preferred are anionic emulsifying agents. These emulsifying agents may be used alone or in combination of any two or more thereof. The amount of the emulsifying agent used is 0.1 to 10 parts by weight and preferably 2 to 6 parts by weight on the basis of 100 parts by weight of the whole monomers.

Examples of the polymerization initiator include inorganic peroxides such as sodium persulfate, potassium persulfate, ammonium persulfate, potassium perphosphate and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide and benzoyl peroxide; and azo compounds such as azobisisobutyronitrile, azobis-2,4-dimethyl valeronitrile and methyl azobisisobutyrate. Among these polymerization initiators, preferred are the inorganic peroxides, because the use thereof enables a stable production of the latex, and dip-formed articles produced therefrom can exhibit a high tensile strength and an excellent touch and feel. These polymerization initiators may be used alone or in combination of any two or more thereof. The amount of the polymerization initiator used slightly varies depending upon kinds thereof, and is usually 0.01 to 1 part by weight on the basis of 100 parts by weight of the whole monomers.

The peroxide initiator may be used in combination with a reducing agent as a redox-based polymerization initiator. Examples of the reducing agent include compounds containing a metal ion in a reduced state such as ferrous sulfate and cuprous naphthenate; sulfonic acid compounds such as sodium methanesulfonate; and amine compounds such as dimethyl aniline, though not particularly limited thereto. These reducing agents may be used alone or in combination of any two or more thereof. The amount of the reducing agent used is about 0.03 to 10 parts by weight on the basis of 1 part by weight of the peroxide.

The emulsion polymerization is preferably conducted in the presence of a chain transfer agent in order to control a toluene insoluble content in the obtained copolymer as well as a toluene swelling degree thereof.

Examples of the chain transfer agent include mercaptans such as n-butyl mercaptan and t-dodecyl mercaptan; sulfides such as tetraethyl thiuram sulfide and dipentamethylene thiuram hexasulfide; α-methylstyrene dimer; and carbon tetrachloride. Among these chain transfer agents, preferred are mercaptans, and more preferred is t-dodecyl mercaptan. These chain transfer agents may be used alone or in combination of any two or more thereof. The amount of the chain transfer agent used slightly varies depending upon kinds thereof, and is preferably 0.1 to 1 part by weight and more preferably 0.2 to 0.5 part by weight on the basis of 100 parts by weight of the whole monomers.

The amount of water used upon the emulsion polymerization is usually about 80 to 600 parts by weight and preferably 100 to 300 parts by weight on the basis of 100 parts by weight of the whole monomers.

The method for addition of the monomer mixture is not particularly limited. As the addition method, there may be suitably used any of the method of charging the respective monomers of the monomer mixture to a polymerization reaction vessel at one time, the method of continuously adding the respective monomers of the monomer mixture to the polymerization reaction vessel, and the method of first charging some of the respective monomers of the monomer mixture to the polymerization reaction vessel and then adding the remaining monomers thereto continuously or in separated parts.

Upon the emulsion polymerization, there may also be used polymerization auxiliary materials such as a particle size modifier, a chelating agent, an acid scavenger and a dispersant, if required.

The polymerization temperature is preferably 5 to 60° C. and more preferably 30 to 50° C., and the polymerization time is about 5 to 30 h.

At the time at which the emulsion polymerization reaches a given polymerization conversion rate, a polymerization terminating agent may be added to the reaction system, if required, to terminate the polymerization reaction. The polymerization conversion rate at which the polymerization should be terminated is preferably 90% by weight or more and more preferably 94% by weight or more.

Examples of the polymerization terminating agent include hydroxyl amine, hydroxyaminesulfuric acid salts, diethyl hydroxyamine, hydroxyaminesulfonic acid and alkali metal salts thereof, sodium dimethyldithiocarbamate, hydroquinone derivatives, catechol derivatives, and aromatic hydroxydithiocarboxylic acids such as hydroxydimethylbenzenethiocarboxylic acid, hydroxydiethylbenzenedithiocarboxylic acid and hydroxydibutylbenzenedithiocarboxylic acid and alkali metal salts thereof. The amount of the polymerization terminating agent used is not particularly limited, and is usually 0.1 to 2 parts by weight on the basis of 100 parts by weight of the whole monomers.

Thereafter, the residual monomers are removed from the thus obtained copolymer, if required, and then a solid content and a pH of the resultant copolymer latex are controlled to desired values to obtain the dip-forming latex as aimed.

In order to adjust the pH of the latex, a basic substance may be added thereto. Examples of the basic substance include alkali metal hydroxides such as sodium hydroxide and potassium hydroxide; alkali metal carbonates such as sodium carbonate and potassium carbonate; alkali metal hydrogencarbonates such as sodium hydrogencarbonate; ammonia; and organic amine compounds such as trimethyl ammonium and triethanol amine. Among these basic substances, the alkali metal hydroxides and ammonia are preferably used. These basic substances may be added in the form of a solution, preferably an aqueous solution, containing the respective basic substances in an amount of 1 to 40% by weight and preferably 2 to 15% by weight, in order to prevent formation of agglomerates upon addition thereof.

In the present invention, it is essentially required that the copolymer constituting the dip-forming latex has a toluene insoluble content of 30% by weight or more. When the toluene insoluble content in the copolymer is too low, the resultant dip-formed article tends to be deteriorated in persistence of close fitting. The toluene insoluble content in the copolymer is preferably in the range of 50 to 95% by weight and more preferably 70 to 90% by weight. When the toluene insoluble content in the copolymer lies within the above-specified range, the resultant dip-formed article can exhibit an excellent balance between touch and feel, elongation at break and persistence of close fitting. The toluene insoluble content in the copolymer is expressed by the value measured by the evaluation method as defined in the below-mentioned Examples.

Meanwhile, the toluene insoluble content in the copolymer may be suitably adjusted by appropriately selecting various factors such as polymerization temperature, reaction time, kind and amount of the polymerization initiator used, kind and amount of the crosslinkable monomer used and kind and amount of the chain transfer agent used.

In the present invention, it is essentially required that the copolymer constituting the dip-forming latex has a toluene swelling degree of 70 times or less. When the toluene swelling degree of the copolymer is too high, the resultant dip-formed article tends to be deteriorated in persistence of close fitting. The toluene swelling degree of the copolymer is preferably in the range of 10 to 60 tomes and more preferably 30 to 50 times. When the toluene swelling degree of the copolymer lies within the above-specified range, the resultant dip-formed article can exhibit an excellent balance between touch and feel, elongation at break and persistence of close fitting. The toluene swelling degree of the copolymer is expressed by the value measured by the evaluation method as defined in the below-mentioned Examples.

Meanwhile, the toluene swelling degree of the copolymer may be suitably adjusted by appropriately selecting various factors such as polymerization temperature, reaction time, kind and amount of the polymerization initiator used, kind and amount of the crosslinkable monomer used, and kind, amount and addition method of the chain transfer agent used.

The dip-forming latex used in the present invention has a number-average particle size of preferably 60 to 300 nm and more preferably 80 to 150 nm as measured by a transmission electron microscope. Meanwhile, the number-average particle size of the dip-forming latex may be adjusted to a desired value by controlling amounts of the emulsifying agent and polymerization initiator used.

The dip-forming latex may also contain, if required, auxiliary materials such as an anti-aging agent, an ultraviolet absorber, an antiseptic agent and a anti-fungus agent.

Dip-Forming Composition

The dip-forming composition of the present invention is prepared by blending the above dip-forming latex with 0.5 to 2 parts by weight of a vulcanizing agent, 0.25 to 1 part by weight of a vulcanization accelerator and 0.5 to 1 part by weight of zinc oxide on the basis of 100 parts by weight of a solid content of the dip-forming latex.

The vulcanizing agent may be selected from those ordinarily used for dip forming processes. Examples of the vulcanizing agent include sulfurs such as powdery sulfur, flower of sulfur, precipitated sulfur, colloid sulfur, surface-treated sulfur and insoluble sulfur; and polyamines such as hexamethylenediamine, triethylenetetramine and tetraethylenepentamine. Among these vulcanizing agents, preferred are sulfurs.

The amount of the vulcanizing agent blended is 0.5 to 2 parts by weight, preferably 0.5 to 1.5 parts by weight and more preferably 0.5 to 1 part by weight on the basis of 100 parts by weight of the solid content of the latex. When the amount of the vulcanizing agent blended is too small, the resultant dip-formed article tends to be deteriorated in persistence of close fitting. On the other hand, when the amount of the vulcanizing agent blended is too large, the resultant dip-formed article tends to be deteriorated in touch and feel.

The vulcanization accelerator may be selected from those ordinarily used for dip forming processes. Examples of the vulcanization accelerator include dithiocarbamic acids such as diethyldithiocarbamic acid, dibutyldithiocarbamic acid, di-2-ethylhexyldithiocarbamic acid, dichlorohexyldithiocarbamic acid, diphenyldithiocarbamic acid and dibenzyldithiocarbamic acid, and zinc salts thereof; 2-mercaptobenzothiazole; 2-mercaptobenzothiazole zinc salt; 2-mercaptothiazoline; dibenzothiazyl disulfide; 2-(2,4-dinitrophenylthio)benzothiazole; 2-(N,N-diethylthio-carbamylthio)benzothiazole; 2-(2,6-dimethyl-4-morpholinothio) benzothiazole; 2-(4'-morpholino-dithio)benzothiazole, 4-morpholinyl-2-benzothiazyl disulfide; and 1,3-bis(2-benzothiazyl-mercaptomethyl)urea. These vulcanization accelerators may be used alone or in combination of any two or more thereof.

The amount of the vulcanization accelerator blended is 0.25 to 1 part by weight, preferably 0.25 to 0.75 part by weight and more preferably 0.25 to 0.5 part by weight on the basis of 100 parts by weight of the solid content of the latex. When the amount of the vulcanization accelerator blended is too small, the resultant dip-formed article tends to be deteriorated in tensile strength. On the other hand, when the amount of the vulcanization accelerator blended is too large, the resultant dip-formed article tends to be deteriorated in touch and feel.

The amount of zinc oxide blended is 0.5 to 1 part by weight, preferably 0.3 to 0.9 part by weight and more preferably 0.5 to 0.8 part by weight on the basis of 100 part by weight of the solid content of the latex. When the amount of zinc oxide blended is too small, the resultant dip-formed article tends to be deteriorated in tensile strength. On the other hand, when the amount of zinc oxide blended is too large, the resultant dip-formed article tends to be deteriorated in touch and feel and elongation at break.

The dip-forming composition of the present invention may further contain, if required, a pH modifier, a thickening agent, an anti-aging agent, a dispersant, a pigment, a filler and a softening agent.

The solid content of the dip-forming composition of the present invention is preferably 10 to 60% by weight and more preferably 20 to 45% by weight.

The pH of the dip-forming composition of the present invention is preferably 8.5 to 12 and more preferably 9 to 11.

Dip-Formed Article

The dip-formed article of the present invention is obtained by dip-forming the above dip-forming composition.

The dip-forming method used in the present invention may be any conventionally known ones. Examples of the dip-forming method include a direct dipping method, an anode coagulation dipping method and a Teague coagulation dipping method. Among these methods, the anode coagulation dipping method is especially preferred because of facilitated production of a dip-formed article having a uniform thickness.

In the anode coagulation dipping method, for example, a dip-forming mold is immersed in a coagulant solution to attach the coagulant onto the surface of the mold, and then immersed in the dip-forming composition to form a dip-forming composition layer on the surface of the mold.

Examples of the coagulant include metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Among these coagulants, preferred are calcium chloride and calcium nitrate. The coagulant may be usually used in the form of a solution in water, alcohol or a mixture thereof. The concentration of the coagulant in the solution is usually 5 to 70% by weight and preferably 20 to 50% by weight.

The dip-forming composition layer formed on the surface of the mold is usually heat-treated for vulcanizing the composition. Prior to the heat treatment, the dip-forming composition layer may be immersed in water, preferably in hot water heated to 30 to 70° C., for about 1 to 60 min to remove water-soluble impurities (such as, for example, excessive amounts of the emulsifying agent and coagulant). The water immersion procedure may be conducted subsequent to the heat treatment, but is preferably performed prior to the heat treatment in view of more efficient removal of the water-soluble impurities.

The heat treatment may be usually conducted at a temperature of 100 to 150° C. for 10 to 120 min. As the heating method, there may be used external heating methods using an infrared ray or hot air, and internal heating methods using a high frequency. Among these methods, preferred is the external heating method using hot air.

The vulcanized dip-forming composition layer is then released from the dip-forming mold to obtain the aimed dip-formed article. As the releasing method, there may be used the method of peeling or releasing the article from the mold by hands, or the method of peeling or releasing the article from the mold under water pressure or compressed air pressure.

When the dip-formed article is a glove, for the purposes of preventing the dip-formed articles from adhering to each other at contact surfaces thereof and imparting a good slip property upon putting-on and putting-off thereof, inorganic fine particles or organic fine particles such as talc, calcium carbonate and starch particles may be scattered over the surface of the glove, an elastomer layer containing these fine particles may be formed on the surface of the glove, or a surface layer of the glove may be chlorinated.

The dip-formed article of the present invention exhibits a stress upon 300% elongation of 2.5 MPa or less, a tensile strength of 15 MPa or more and preferably 20 MPa or more, a elongation at break of 600% or more, and a stress retention rate of 45% or more and preferably more than 50% as measured after 6 min from 100% elongation thereof.

EXAMPLES

The present invention is described in more detail by referring to the following examples. Meanwhile, in the following examples, the terms "%" and "part(s)" represent "% by weight" and "part(s) by weight", respectively, unless otherwise specified.

Evaluation Methods
(1) pH Values of Dip-Forming Latex and Dip-Forming Composition Measured at 25° C. using a pH meter "M12" available from HORIBA.
(2) Toluene Swelling Degree and Toluene Insoluble Content of Copolymer The dip-forming latex whose solid content and pH were adjusted to 30% and 8.5, respectively, was cast into a framed glass plate, and then allowed to stand at a temperature of 20° C. and a relative humidity of 65% for 120 h to obtain a dried film having a thickness of 1 mm.

Then, 0.2 g (W1) of the thus obtained dried film was placed in a 80-mesh cage-shaped metal gauze, and immersed in 100 mL of toluene at 20° C. for 24 h. After the immersion, the weight (W2) of the film impregnated with toluene (toluene-swelled film) was measured. Next, the thus obtained toluene-swelled film was dried at 105° C. to remove toluene therefrom, and then the weight (W3) of the thus dried film was measured.

The toluene swelling degree was calculated from the following formula (1):

Toluene Swelling Degree (unit:times)=$W2/W3$ (1)

Also, the toluene insoluble content was calculated from the following formula (2):

Toluene Insoluble Content (unit: %)=$(W3/W1) \times 100$ (2)

(3) Preparation of Test Piece for Evaluation of Physical Properties of Dip-Formed Article A dip-formed article in the form of a rubber glove was punched using a dumbbell (Die-C) according to ASTM D412 to prepare a test piece.
(4) Stress upon 300% Elongation (MPa)

The test piece was subjected to a tensile test at an elastic stress rate of 500 mm/min using a Tensilon universal tester "RTC-1225A" available from Orientec Co., Ltd., to measure a tensile stress thereof upon 300% elongation. The lower the tensile stress value, the more excellent the touch and feel of the dip-formed article became.

(5) Tensile Strength (MPa)

The test piece was subjected to a tensile test at an elastic stress rate of 500 mm/min using the Tensilon universal tester to measure a tensile strength thereof immediately before breaking.
(6) Elongation at Break (%)

The test piece was subjected to a tensile test at an elastic stress rate of 500 mm/min using the Tensilon universal tester to measure an elongation thereof immediately before breaking.
(7) Stress Retention Rate (%)

The test piece was pulled using the Tensilon universal tester until reaching an elongation percentage of 100%, and held for 6 min while keeping the elongation percentage of 100% and a tensile stress (Md0) immediately after reaching the elongation percentage, and then a tensile stress (Md6) of the test piece was measured again. A stress retention rate (%) of the test piece was calculated by dividing Md6 by Md0. The larger the stress retention rate, the more excellent the persistence of close fitting of the dip-formed article is.

Production Example 1

A pressure-resistant polymerization reaction vessel was charged with 22 parts of styrene, 3 parts of methacrylic acid, 75 parts of 1,3-butadiene, 0.3 part of t-dodecyl mercaptan as a chain transfer agent (hereinafter occasionally referred to merely as "TDM"), 150 parts of deionized water, 2.5 parts of sodium dodecylbenzenesulfonate, 0.3 part of potassium persulfate and 0.1 part of sodium ethylenediaminetetracetate, and the temperature of the reaction system was raised to 45° C. to initiate a polymerization reaction thereof.

The polymerization reaction was continued until reaching a polymerization conversion rate of 95%, and then 0.1 part of diethylhydroxyamine was added to the reaction system to terminate the polymerization reaction.

After removing unreacted monomers from the thus obtained copolymer latex, a solid content and a pH thereof were adjusted to obtain a dip-forming latex A having a solid content of 45% and a pH of 8.5.

The thus obtained dip-forming latex A was subjected to measurements to determine a toluene insoluble content and a toluene swelling degree of the copolymer constituting the latex. The results are shown in Table 1.

Production Examples 2 To 7

The same polymerization procedure as in Production Example 1 was repeated except that composition of the monomers, and amount and addition conditions of TDM were varied as shown in Table 1, thereby obtaining dip-forming latexes B to G. The respective dip-forming latexes were subjected to measurements to determine a toluene insoluble content and a toluene swelling degree of the copolymer constituting each latex. The results are shown in Table 1.

Meanwhile, in Production Examples 3, 4, 6 and 7, when the polymerization conversion rate reached 60% and 80%, TDM was added to the polymerization reaction vessel in such an amount as shown in Table 1 to produce the respective latexes.

TABLE 1

|  | Production Examples | | | | | | |
|---|---|---|---|---|---|---|---|
|  | 1 | 2 | 3 | 4 | 5 | 6 | 7 |
| Formulation for polymerization Initial charges (part) Composition of monomers | | | | | | | |
| 1,3-butadiene | 75 | 80 | 75 | 75 | 58 | 75 | 82 |
| Styrene | 22 | 16 | 22 | 22 | 37 | 22 | 15 |
| Methaerylic acid | 3 | 4 | 3 | 3 | 5 | 3 | 3 |
| Chain transfer agent | | | | | | | |
| t-dodecyl mercaptan | 0.3 | 0.3 | 0.3 | 0.3 | 0.3 | 0.3 | 0.3 |
| Amount of chain transfer agent post-added (part) | | | | | | | |
| Polymerization conversion: 60% | — | — | 0.1 | 0.15 | — | 0.3 | 0.1 |
| Polymerization conversion: 80% | — | — | 0.1 | 0.15 | — | 0.3 | 0.15 |
| Dip-forming latex | A | B | C | D | E | F | G |
| Properties of copolymer | | | | | | | |
| Toluene insoluble content (%) | 79.7 | 89.3 | 37.2 | 9.1 | 79.7 | 3.6 | 43.1 |
| Toluene swelling degree (times) | 43 | 17 | 49 | 64 | 28 | 112 | 87 |

Example 1

A vulcanizing agent-containing dispersion was prepared by blending 1.0 part of sulfur, 0.5 part of zinc diethyldithiocarbamate, 0.5 part of zinc oxide, 1,5 parts of titanium oxide, 0.03 part of potassium hydroxide and 5.63 parts of water, and then 9.16 parts of the thus prepared dispersion was mixed with 222.2 parts of the dip-forming latex (having a solid content of 100 parts). Thereafter, an adequate amount of deionized water was added to the resultant mixture to adjust a solid content and a pH thereof to 30% and 9.0, respectively. The obtained reaction mixture was further aged for one day to obtain a dip-forming composition.

On the other hand, 20 parts of calcium nitrate, 0.05 part of polyoxyethylene octyl phenyl ether as a nonionic emulsifying agent and 80 parts of water were mixed with each other to prepare an aqueous coagulant solution. A glove dip-forming mold heated to 60° C. was immersed in the thus obtained aqueous coagulant solution for 10 s, lifted up therefrom, and then dried at 60° C. for 10 min to allow the coagulant to adhere to the glove mold.

Next, the glove mold to which the coagulant adhered was immersed in the above dip-forming composition for 15 s, and then lifted up therefrom to obtain a dip-forming composition layer on the surface of the glove mold. The glove mold provided thereon with the dip-forming composition layer was immersed in distilled water maintained at 40° C. for 5 min to remove water-soluble impurities therefrom, pre-dried at 20° C. for 5 min, substantially dried at 60° C. for 10 min, and then vulcanized at 120° C. for 30 min to obtain a solid coat on the surface of the glove mold. Finally, the thus obtained solid coat was released from the glove mold to obtain a glove-shaped dip-formed article having a thickness of 0.1 mm. The thus obtained dip-formed article was subjected to measurements to evaluate various properties thereof. The results are shown in Table 2.

Examples 2 To 4 And Comparative Examples 1 To 5

The same procedure as in Example 1 was repeated except that the dip-forming latex and the vulcanizing agent-containing dispersion were replaced with those shown in Table 2, thereby obtaining dip-formed articles. The thus obtained dip-formed articles were subjected to measurements to evaluate various properties thereof. The results are shown in Table 2.

TABLE 2

|  | Examples | | | | Comparative Examples | | | | |
|---|---|---|---|---|---|---|---|---|---|
|  | 1 | 2 | 3 | 4 | 1 | 2 | 3 | 4 | 5 |
| Dip-forming latex | A | B | A | C | A | D | E | F | G |
| Vulcanizing agent-containing dispersion (parts based on 100 parts of solid content in dip-forming latex) | | | | | | | | | |
| Sulfur | 1.0 | 1.0 | 0.5 | 2.0 | 2.0 | 1.0 | 1.0 | 1.0 | 1.0 |
| Zinc diethyldithiocarbamate | 0.5 | 0.5 | 0.25 | 1.0 | 1.2 | 0.5 | 0.5 | 0.5 | 0.5 |
| Zinc oxide | 0.5 | 0.5 | 0.5 | 1.0 | 2.0 | 0.5 | 0.5 | 0.5 | 0.5 |
| Titanium oxide | 1.5 | 1.5 | 1.5 | 1.5 | 1.5 | 1.5 | 1.5 | 1.5 | 1.5 |
| pH of dip-forming composition | 9.0 | 9.0 | 9.3 | 9.0 | 9.0 | 9.0 | 9.0 | 9.0 | 9.0 |
| Properties of dip-formed article | | | | | | | | | |
| Stress upon 300% elongation (MPa) | 2.3 | 2.4 | 2.3 | 1.6 | 4.8 | 1.4 | 5.5 | 1.0 | 2.6 |
| Tensile strength (MPa) | 23.6 | 20.0 | 26.0 | 16.2 | 38.5 | 14.0 | 44.3 | 11.5 | 15.2 |
| Elongation at break (%) | 760 | 670 | 810 | 810 | 520 | 980 | 605 | 1030 | 800 |
| Stress retention rate (%) | 52.4 | 54.6 | 53.9 | 51.2 | 41.0 | 38.2 | 39.9 | 32.8 | 39.6 |

From Table 2, the followings were confirmed:

When using the dip-forming composition in which the vulcanization accelerator and zinc oxide were respectively blended in amounts larger than those defined in the present invention, the resultant dip-formed article was deteriorated in elongation at break and touch and feel and exhibited a low stress retention rate (Comparative Example 1).

When using the dip-forming latex D having a lower toluene insoluble content than that defined in the present invention, the resultant dip-formed article was insufficient in tensile strength and exhibited a low stress retention rate (Comparative Example 2).

When using the dip-forming latex E obtained from such a monomer mixture containing a larger amount of styrene than that defined in the present invention and a smaller amount of 1,3-butadiene than that defined in the present invention, the resultant dip-formed article was deteriorated in touch and feel and exhibited a low stress retention rate (Comparative Example 3).

When using the dip-forming latex F whose toluene insoluble content and toluene swelling degree were both out of the ranges as defined in the present invention, the resultant dip-formed article was insufficient in tensile strength and exhibited a low stress retention rate (Comparative Example 4).

When using the dip-forming latex G whose toluene swelling degree was out of the range as defined in the present invention, the resultant dip-formed article exhibited a low stress retention rate (Comparative Example 5).

As compared to the dip-formed articles obtained in these Comparative Examples, the dip-formed articles obtained in Examples 1 to 4 which were produced from the dip-forming compositions satisfying all of the requirements as defined in the present invention, all exhibited an excellent touch and feel, sufficient tensile strength and elongation at break, and an excellent persistence of close fitting.

INDUSTRIAL APPLICABILITY

The dip-formed article of the present invention can be produced with a thickness of about 0.1 to 3 mm, especially a thickness as small as 0.1 to 0.3 mm, and therefore can be suitably applied to medical products such as nipple of nursing bottles, pipettes, ducts and water pillows; toys and sports goods such as balloons, dolls and balls; industrial products such as bags for pressure forming and bags for gas storage; gloves for medical, household, agricultural and fishery uses; and finger cots, in particular, to thin medical gloves.

The invention claimed is:

1. A dip-forming composition comprising:
    a dip-forming latex containing a copolymer obtained by copolymerizing 100 parts by weight of a monomer mixture containing 70 to 85 parts by weight of a conjugated diene monomer, 10 to 28 parts by weight of an aromatic vinyl monomer, 2 to 5 parts by weight of an ethylenically unsaturated acid monomer and 0 to 18 parts by weight of other monomer copolymerizable with these monomers, said copolymer having a toluene insoluble content of 30% by weight or more and a toluene swelling degree of 70 times or less; and
    a vulcanizing agent, a vulcanization accelerator and zinc oxide which are blended in said latex in amounts of 0.5 to 2 parts by weight, 0.25 to 1 part by weight and 0.5 to 1 part by weight, respectively, on the basis of 100 parts by weight of a solid content of the latex.

2. The dip-forming composition according to claim 1, wherein said aromatic vinyl monomer is styrene.

3. The dip-forming composition according to claim 1, wherein said dip-forming latex has a number-average particle size of 60 to 300 nm.

4. The dip-forming composition according to claim 1, wherein said dip-forming composition has a pH of 8.5 to 12.

5. A dip-formed article obtained by dip-forming said dip-forming composition as defined in claim 1.

6. The dip-formed article according to claim 5, wherein said article has a stress retention rate of 45% or more.

7. The dip-formed article according to claim 5, wherein said article is a glove.

* * * * *